(12) United States Patent
Okabe et al.

(10) Patent No.: US 6,386,279 B1
(45) Date of Patent: May 14, 2002

(54) AUTOMOTIVE AIR-CONDITIONING APPARATUS

(75) Inventors: Takanori Okabe; Kenji Takenaka; Takashi Ban, all of Aichi-ken (JP); Toshiro Higuchi, 3-4-26, Edahigashi, Tuzuki-ku, Yokohama, Kanagawa-ken (JP)

(73) Assignees: Kabushiki Kaisha Toyoda Jidoshokki Seisakusho, Kariya; Toshiro Higuchi, Yokohama, both of (JP)

( * ) Notice: Subject to any disclaimer, the term of this patent is extended or adjusted under 35 U.S.C. 154(b) by 0 days.

(21) Appl. No.: 09/170,587

(22) Filed: Oct. 13, 1998

(30) Foreign Application Priority Data

Oct. 13, 1997 (JP) ............................... 9-279145

(51) Int. Cl.⁷ .............................................. F25B 29/00
(52) U.S. Cl. ........................... 165/202; 165/42; 165/43; 165/41; 237/12.3 R; 237/12.3 B; 310/64; 318/436; 219/200; 219/201
(58) Field of Search ....................... 237/12.3 R, 12.3 B; 219/200, 201; 318/159, 160, 436; 310/64, 184; 165/202, 42, 43

(56) References Cited

U.S. PATENT DOCUMENTS

| | | | | |
|---|---|---|---|---|
| 2,749,049 A | | 6/1956 | Smith | |
| 4,355,269 A | * | 10/1982 | Burton et al. ............... | 318/436 |
| 4,373,147 A | * | 2/1983 | Carlson, Jr. ................ | 318/436 |
| 4,484,049 A | * | 11/1984 | Ahner et al. ................. | 310/54 |
| 4,638,643 A | * | 1/1987 | Sakazume et al. .......... | 318/436 |
| 5,334,898 A | * | 8/1994 | Skybyk ....................... | 310/268 |
| 5,334,899 A | * | 8/1994 | Skybyk ....................... | 310/268 |
| 5,497,941 A | * | 3/1996 | Numazawa et al. .......... | 165/43 |
| 5,531,285 A | * | 7/1996 | Green .......................... | 165/41 |
| 5,678,760 A | * | 10/1997 | Muso et al. .................. | 165/41 |
| 5,819,551 A | * | 10/1998 | Fukumoto et al. ............ | 62/160 |
| 5,934,360 A | * | 8/1999 | Ban et al. ..................... | 165/43 |
| 6,222,289 B1 | * | 4/2001 | Adames ....................... | 310/64 |

FOREIGN PATENT DOCUMENTS

| | | |
|---|---|---|
| EP | 0 971 046 | 7/1982 |
| JP | 5-8633 | * 1/1993 |

* cited by examiner

*Primary Examiner*—John K. Ford
(74) *Attorney, Agent, or Firm*—Morgan & Finnegan, LLP

(57) ABSTRACT

To make it possible to provide high quality heating or warming with low environmental pollution for a low environmental pollution vehicle such as an electric vehicle or a hybrid vehicle, an automotive air-conditioning apparatus has a hot water circuit that includes a hot water heater (heat source unit), a hot water circulating pump and a heater core to thereby perform a heating operation for heating passenger compartment air wherein, an electric motor is excited under the condition that the rotation thereof is fixed to thereby generate heat in the electric motor. The generated heat is utilized as a heat source for the hot water heater. The restricting mechanism may include two electric motors which are rotated in opposite directions to each other or a lock mechanism. Also, a cooling operation for cooling the passenger compartment air may be performed by driving the compressor (heat source unit) with the electric motors, a dehumidifying operation may be performed by simultaneously effecting the heating and cooling operations, or a heat pump type heating operation may be performed by having the refrigerant circuit acting reversibly.

7 Claims, 7 Drawing Sheets

AUTOMOTIVE AIR-CONDITIONING APPARATUS

BACKGROUND OF THE INVENTION

The present invention relates to an automotive air-conditioning apparatus, and more particularly to an automotive air-conditioning apparatus for heating an electric power motor with exciting electric power as a heating or warming source.

Conventionally, a combustion type heater has been extensively used for heating the air in a passenger compartment or as a heat source for heating in vehicles. On the other hand, although electric vehicles and hybrid vehicles have been developed recently as countermeasures to environmental pollution, combustion type heaters have conventionally been used as a heat source for heating in such low environmental pollution vehicles.

However, the combustion type heater suffers in that it pollutes the environment by the generation of a combustion exhaust gas. Thus, this heat source for heating runs counter to the intended purpose of a low environmental pollution vehicle. Consequently, it is necessary to develop a non-combustion type heater as heater for heating that meets the intended purpose of electric and hybrid vehicles, i.e. low environmental pollution.

SUMMARY OF THE INVENTION

In view of the foregoing problems inherent in the prior art, an object of the present invention is to provide an automotive air-conditioning apparatus which meets the intended purpose of low environmental pollution vehicles such as electric and hybrid vehicles, and which may perform high quality heating with low environmental pollution.

In order to attain these and other objects, according to one aspect of the present invention, there is provided an automotive air-conditioning apparatus comprising a hot water circuit for heating a passenger compartment, the hot water circuit including a hot water heater, a hot water circulating pump, and a heater core for heating the air of the passenger compartment using hot water conveyed by the hot water circulating pump, wherein: the hot water heater comprises at least one electric motor as a heat source, the electric motor being electromagnetically excited in a state such that the rotation thereof is restricted to thereby generate heat.

With such an arrangement, since the heat generated in the electric motor by the exciting power is used as the heat source for heating passenger compartment air, it is possible to perform heating operations with the non-combustion type heater. Accordingly, it is possible to provide an automotive air-conditioning apparatus with no potential for polluting the air and that meets the object of low environmental pollution. Further, it is possible to consider an electric heater for heating air, such as a sheathed type heater using a resistor wire as a heating element, as a heat source using electric power. However, the temperature of the resistor wire is high, and there is a fear that a fire might be generated or the wire might break. Accordingly, this is not particularly suitable for use in a vehicle which is subjected to frequent vibrations. In contrast, in the case where an electric motor is used to generate heat as in the present invention, the heating area of the heating wire is made so large that the temperature of the exciting winding may be suppressed to a relatively low level. Thus, such a disadvantage may be overcome.

Also, the restricting means may be easily attained according to a second aspect of the invention, by connecting two motors which are electromagnetically excited in reverse rotational directions to each other or alternatively, according to a third aspect of the invention by using a lock mechanism.

Also, according to a fourth aspect of the invention, the automotive air-conditioning apparatus further comprises a refrigerant circuit for cooling the passenger compartment, the refrigerant circuit comprising a compressor, an exterior heat exchanger, an expansion mechanism, and an interior heat exchanger, wherein: the compressor is driven by the electric motor while the rotation of the electric motor is in a non-restricted state. With such an arrangement, the cooling operation, as well as the above-described heating operation, may be performed by using the electric motor per se for generating the exciting power and also for driving the compressor, so the cost therefor may be reduced.

Also according to a fifth aspect of the invention, the automotive air-conditioning apparatus further comprises a refrigerant circuit for cooling the passenger compartment, the refrigerant circuit comprising a compressor, an exterior heat exchanger, an expansion mechanism, and an interior heat exchanger, wherein: the two electric motors comprise a reversible-rotation motor capable of rotating in a reversible rotational direction, and a constant-rotation motor having a rotational torque that is greater than that of the reversible-rotation motor, and by selectively switching the electromagnetic exciting direction of the reversible-rotation motor the two electric motors are driven in the same rotational direction or reverse rotational direction to each other, with the result that the compressor is driven by the constant-rotation motor that is electromagnetically excited.

With such an arrangement, the two electric motors are excited to be rotated in the same constant rotational direction so that the cooling operation may be performed by the refrigerant circuit. Also, the reversible-rotation motor having the smaller rotational torque is excited to be rotated in the reverse rotational direction so that the two electric motors are excited in the reverse rotational directions to each other, and the rotations thereof are restricted to generate the heat. However, the compressor is rotated by the constant-rotation motor having the larger rotational torque. Accordingly, the heating operation by the hot water circuit using the heat generated by the two electric motors as the heat source and the cooling operation for cooling the passenger compartment air through the refrigerant circuit are simultaneously performed to perform a so-called dehumidifying operation.

Also, in a sixth aspect of the invention, there is provided an automotive air-conditioning apparatus, comprising: a hot water circuit for heating a passenger compartment comprising a hot water heater, a hot water circulating pump, and a heater core for heating the air of the passenger compartment using hot water conveyed by the hot water circulating pump, and a refrigerant circuit for cooling the passenger compartment comprising a compressor connected to a first electric motor, an exterior heat exchanger, an expansion mechanism, and an interior heat exchanger, wherein: the hot water heater comprises at least a second electric motor and a heater utilizing fluid frictional heat as a heat source, the second electric motor generating heat by being electromagnetically excited in a state such that the rotation thereof is restricted by a lock mechanism, the heater utilizing fluid frictional heat comprising two rotors that are located adjacent to and facing each other and viscous fluid interposed between the two rotors, the two rotors being respectively fixed to each of the drive shafts of the first and second electric motors so as to integrally rotate therewith, thereby, the heater utilizing fluid frictional heat being constructed so as to generate fluid frictional heat in the viscous fluid when the second electric motor is restricted and the first electric motor is rotated, the first electric motor being connected to second electric motor through the heater utilizing fluid frictional heat.

With such an arrangement, without locking the second electric motor provided with the lock mechanism, both the first and second electric motors are excited in the same rotational direction to drive the compressor to thereby perform the cooling operation through the refrigerant circuit. Also, the second electric motor is locked by said lock mechanism and the first and second electric motors are exited in the same rotational direction to drive the compressor so that the heating operation through the hot water circuit using the heat generated by the heater utilizing fluid frictional heat and the heat generated by the exciting power of the second electric motor as the heat source is performed, and the above-described cooling operation through the refrigerant circuit is simultaneously performed. As a result, a dehumidifying operation having a large heating performance, i.e., a dehumidifying operation with a touch of heating may be performed. Also, in this condition, when the excitation of the first electric motor is turned off, the heat generation effect of the heater utilizing fluid frictional heat is stopped. Accordingly, the heating capacity is reduced. However, since the cooling operation by the refrigerant circuit is stopped, it is possible to perform the heating operation. Also, when in the condition of the dehumidifying operation with a touch of heating the excitation of the second electric motor is turned off, the heat generating effect of the second electric motor is stopped. As a result, the heating capacity becomes small. The dehumidifying operation having the small heating capacity, i.e., a dehumidifying operation with a touch of cooling may be performed. As described above, according to this aspect of the present invention, four operating modes may be performed.

Also, according to the seventh to ninth aspects of the present invention, the refrigerant circuit in the fourth to sixth aspects of the present invention, is a reversible cycle type, that may be controlled to be selectively switched over reversibly.

Accordingly, according to the seventh aspect of the present invention, when the refrigerant circuit is switched over to the heating cycle to drive the compressor, a heating operation through the refrigerant circuit switched into the heating cycle is performed, and a heat pump type heating operation may be performed to suck in the heat from the outside air.

Also, according to the eighth aspect of the present invention, when the refrigerant circuit is switched over to the heating cycle and the two electric motors are excited in the same rotational direction to drive the compressor, a heating operation is performed by the refrigerant circuit which serves as the heating cycle so that a heat pump type heating operation can be performed. Also, according to the eighth aspect of the present invention, when the refrigerant circuit is switched over to the heating cycle and the two electric motors are excited in rotational directions reverse to each other to drive the compressor, a heating operation through the hot water circuit using the heat generated by the electric motor as a heat source and a heating operation through the refrigerant circuit that serves as the heating cycle are simultaneously performed so that a heating operation having a large heating capacity may be performed. Accordingly, in addition to the two operational modes according to the fifth aspect of the present invention, the two additional heating operational modes may also be provided.

Also, according to a ninth aspect of the present invention, when the refrigerant circuit in the sixth aspect of the present invention is switched over to the heating cycle the second electric motor is not locked and the first electric motor is excited to drive the compressor, a heating operation through the refrigerant circuit which serves as the heating cycle is performed and a heat pump type heating operation can be performed. Also, according to the ninth aspect to the present invention, when the refrigerant circuit is switched over to the heating cycle and the second electric motor is locked by means of the lock mechanism to excite the two electric motors, the compressor is driven and the second electric motor operates to generate heat by the excitation power. Furthermore, the heater utilizing fluid frictional heat operates to generate heat. Accordingly, the heating operation through the hot water circuit using the heat generated by the heater utilizing fluid frictional heat and the heat generated by the excitation power of the second electric motor as the heat source and the heating operation through the refrigerant circuit which serves as the heating cycle are simultaneously performed. Accordingly, a heating operation having a large heating capacity using the three heat sources may be performed. Also, when the excitation of the second electric motor is stopped under this condition the second electric motor does not generate heat, and a heating operation having a correspondingly reduced heating capacity may be performed. Thus, it is possible to add the above described three heating operational modes to the four operational modes according to the sixth aspect of the present invention.

DESCRIPTION OF THE PREFERRED EMBODIMENTS

A first embodiment of the present invention will now be described with reference to FIGS. 1 and 2.

Figure 1:
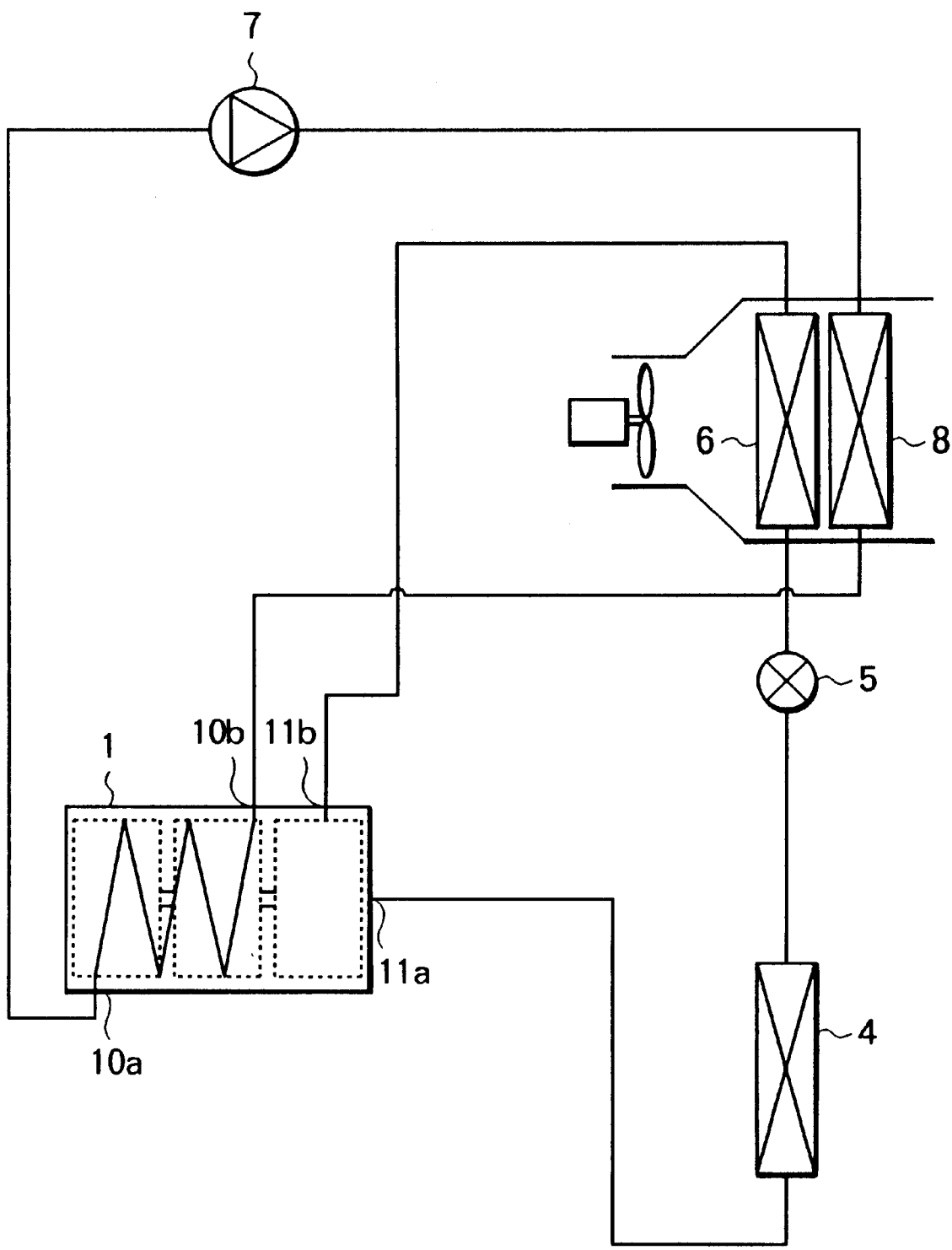
FIG. 1 is a view showing a basic structure of a refrigerant circuit and a hot water circuit in accordance with a first embodiment of the present invention.
Figure 2:
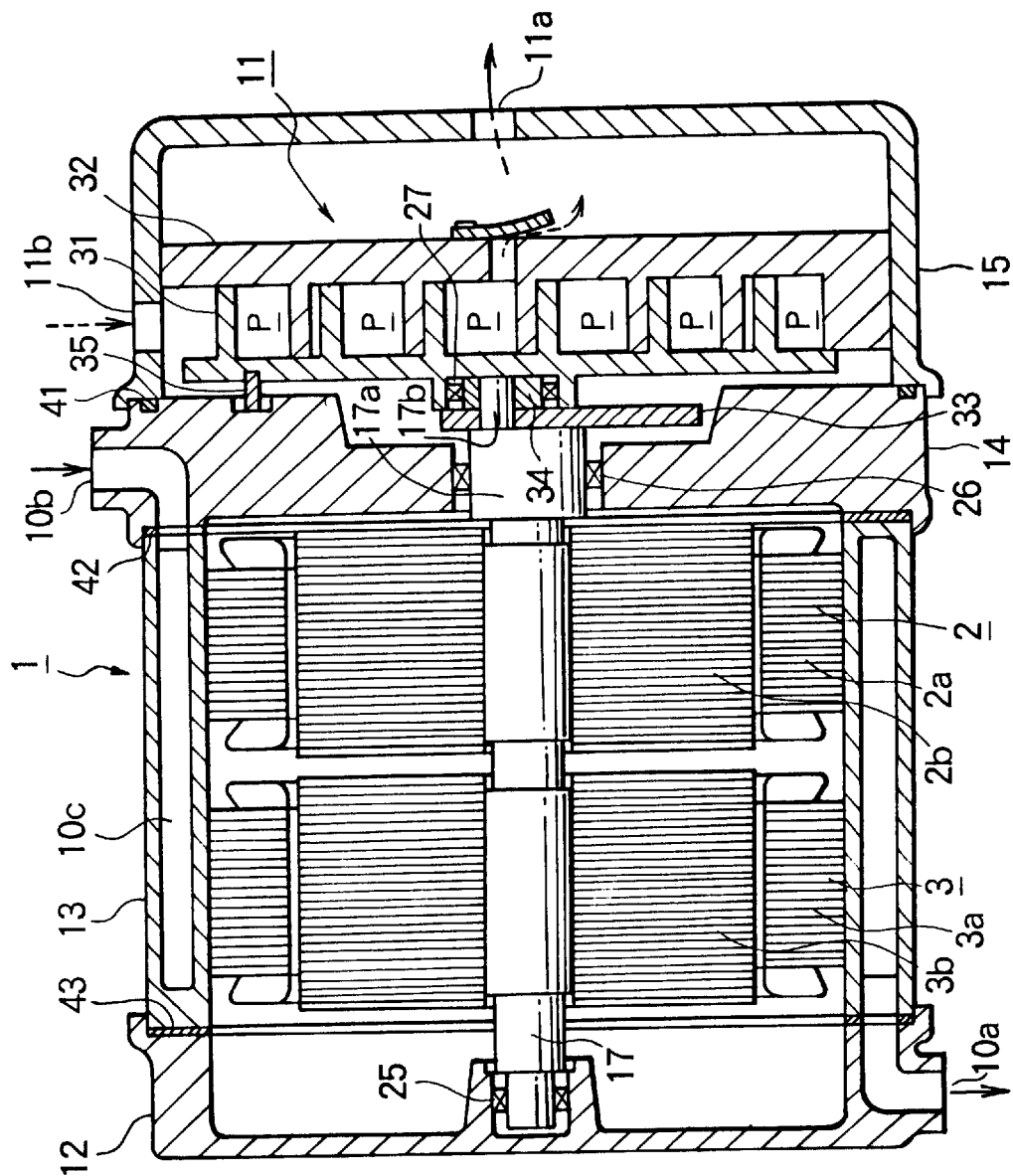
FIG. 2 is a view showing an overall structure of a heat source unit in accordance with the first embodiment of the present invention.

FIG. 1 is a view showing a basic structure of a refrigerant circuit and a hot water circuit of an electric automotive air-conditioning apparatus in accordance with the first embodiment of the present invention. In FIG. 1, a heat source unit 1 is fabricated by integrally combining a cooling compressor and a hot water heater to function as a compressor and a hot water heater. Components such as an exterior heat exchanger 4, an expansion mechanism 5 such as an expansion valve or the like, an interior heat exchanger 6 and the like are connected in this order to thereby form a refrigerant circuit between a refrigerant outlet port 11a and a refrigerant intake port 11b of the heat source unit 1 as a compressor.

On the other hand, a hot water circulating pump 7 and a heater core 8 to be installed in an air-conditioning box within a passenger compartment are connected in this order to thereby form a hot water circuit between a hot water outlet port 10a and a hot water inlet port 10b of the heat source unit 1 as a hot water heater.

Further, the interior heat exchanger 6 of the refrigerant circuit and the heater core 8 of the hot water circuit are arranged in series with each other so that the heater core 8 is at the downstream side of the passenger compartment air flow in the passenger compartment.

The heat source unit 1 will now be described with a reference to FIG. 2. In this case, in the following description as to FIG. 2 it is assumed that the right side of FIG. 2 means the rear side of the unit and the left side means the front side. Also, in FIG. 2, solid arrows denote the direction of flow of the hot water and broken-line arrows denote the direction of flow of the refrigerant.

A housing of the heat source unit 1 is divided into a cup-shaped front housing 12, a cylindrical motor housing 13, a disc-shaped connection housing 14 and a cup-shaped rear housing 15. Stators 2a and 3a of two motors (electric power motors) 2 and 3 are pressingly fitted onto and fixed to an inner wall of the motor housing 13. Also, rotors 2b and 3b of the motors 2 and 3 are juxtaposed to each other and fixed to a drive shaft 17 disposed along an axis of the motor housing 13 and are rotatable together with the drive shaft 17.

The portion of the drive shaft 17 on the front side is rotatably supported by a bearing 25 arranged at a center of the front housing 12 on the inside. Also, a large diameter portion 17a is formed on the rear side of the drive shaft 17 and an eccentric pin 17b is implanted at an end portion thereof. Also, the drive shaft 17 is rotatably supported at the large diameter portion 17a by a bearing 26 arranged at a central portion of the connection housing 14.

The compressor mechanism 11 received in the heat source unit 1 is a scroll type compressor. A movable scroll 31 and a stationary scroll 32 which are the components of the compressor mechanism 11 and the like are received in a space defined by the rear housing 15 and the connection housing 14. Also, a drive bush 34 for rotatably supporting the movable scroll 31 for allowing only an orbital rotation through a bearing 27 in cooperation with a rotation preventing mechanism 35 is fitted around the above-described eccentric pin 17b. Further, a balance weight 33 for absorbing a dynamic unbalance is mounted on the eccentric pin 17b. Moreover, compression chambers P are defined by base plates of the two scrolls 31 and 32 and spiral walls.

The above-described motor 2 is an electric motor for constant rotation. The motor 3 is an electric motor for reversible rotation which may be excited so as to rotate in reverse. Then, the rotational torque obtained when the reversible rotation motor 3 is excited in the reverse rotational direction is set to be in balance with the rotational torque of the constant rotation motor 2.

Accordingly, in the case where the two motors 2 and 3 are excited so that the motors are rotated in the same rotational direction and the compressor mechanism 11 is driven in a predetermined rotational direction, the refrigerant is absorbed from the refrigerant intake port 11b and is compressed in the compression chambers P. Thereafter, the high pressure refrigerant gas is discharged from the refrigerant outlet port 11a. Also, in the above case where the reversible rotation motor 3 is excited in the reverse rotation direction, the compressor mechanism 11 is not driven or rotated and the motors 2 and 3 only generate heat.

A hot water inlet port 10b is formed in the connection housing 14. The hot water inlet port 10b is connected to a hot water passage 10c within the motor housing 13. The hot water passage 10c is formed within the wall member of the motor housing 13 over almost the entire circumference thereof to form an annular passage so that the water can absorb the heat which the motors 2 and 3 generate. Also, the hot water passage 10c is connected to a hot water outlet port 10a formed on a side of the front housing 12.

In the housing structure of the above-described heat source unit 1, the rear housing 15 and the connection housing 14 are connected to each other through an O-ring 41. Also, the connection housing 14 and the motor housing 13, and the motor housing 13 and the front housing 12 are connected to each other through gaskets 42 and 43, respectively.

In the thus constructed automotive air-conditioning apparatus, when the motors 2 and 3 are excited in the predetermined constant direction to drivingly rotate the compressor mechanism 11 in the predetermined direction, it is possible to perform the cooling operation. Namely, the rotational torque is transmitted through the drive shaft 17 to the movable scroll 31, and the movable scroll 31 moves in an orbital motion due to the rotation preventing mechanism 35 to thereby change the volume of each compression chamber P. As a result, the refrigerant gas is introduced from the refrigerant intake port 11b into each compression chamber P and the high pressure refrigerant gas is discharged from the refrigerant outlet port 11a. The high pressure refrigerant gas is cooled and liquefied in the exterior heat exchanger 4, and subsequently, the pressure of the refrigerant gas is reduced in the expansion mechanism 5. The refrigerant gas is subjected to a heat exchange with the passenger compartment air by the interior heat exchanger 6. As a result, the passenger compartment air is cooled. The refrigerant itself is gasified and fed back from the refrigerant intake port 11b for circulation. As described above, the cooling operation to cool the passenger compartment air by means of the refrigerant circuit is performed to thereby make it possible to effect the cooling operation for the passenger compartment.

Next, when the reversible rotation motor 3 is excited in the reverse rotational direction, it is possible to perform the heating operation. Namely, when the motor 3 is rotated in the reverse rotational direction, the two motors 2 and 3 are excited in reverse rotational directions to each other. On the other hand, the rotational torque of the two motors 2 and 3 is in balance. Accordingly, neither motor 2 nor 3 is rotated and heat is generated by the exciting electric power. The hot water that has been fed from the hot water inlet port 10b by the hot water circulating pump 7 is heated by this heating effect and fed from the hot water outlet port 10a to the heater core 8 to thereby heat the passenger compartment air. Thus, it is possible to effect the heating operation for the passenger compartment.

As described above,. according to the first embodiment of the present invention, it is possible to selectively switch to the cooling operation by the refrigerant circuit and the heating operation using the heat generated by the exciting electric power of the motors 2 and 3 as a heat source by switching the reversible rotational motor 3 to rotate in either direction. Also, since the motors 2 and 3 are used not only as the heat source unit for the heating operation but also as the compressor drive motor for the cooling operation, it is possible to reduce the cost of the air-conditioning apparatus. Also, since this switching operation may be performed by switching circuit wiring, it is not necessary to use a complicated switching mechanism and the structure may be simplified.

Also, when the motors 2 and 3 are excited in reverse rotational directions to each other to carry out the heating operation, the heat generated by the motors 2 and 3 due to the exciting electric power is utilized as the heat source of the hot water heater. Accordingly, it is possible to avoid air pollution caused by combustion exhaust gas.

Further, the exciting windings for generating the heat have a large heat generating area. Also, the heat generated by the exciting windings of the motors 2 and 3 is absorbed into the hot water that flows through the hot water passage 10c formed within the motor housing 13. Accordingly, the temperature of the exciting windings as the heating wires is low in comparison with a sheathed heater that uses heat generated from resistor wires to directly heat the passenger compartment air. Accordingly, in the embodiment of the present invention, there is no fear of a fire and the system is safe to use. It is also possible to obtain a heater with excellent vibration resistance.

Further, as a modification of the above-described first embodiment of the present invention, the rotational torque upon the reverse rotation of the reversible rotational motor 3 may be smaller than the rotational torque of the constant rotation motor 2 by making the rotational torque obtained when the reversible rotational motor 3 is rotated in reverse and the rotational torque of the constant rotational motor 2 differ.

In this case, since the torque of the constant rotation motor 2 is large when the reversible rotational motor 3 is excited in the reverse rotational direction, the motors 2 and 3 are rotated in the forward direction and drive the compressor 1 while generating heat due to the exciting electric power. Thus, after the passenger compartment air has been cooled and dehumidified in the interior heat exchanger 6 of the above-described refrigerant circuit, the air is heated by the heater core 8. Accordingly, it is possible to perform a so-called dehumidifying operation.

Accordingly, by differentiating the rotational torque of the two motors 2 and 3 and switching the reversible rotational motor from the forward rotation to the reverse rotation, it is possible to selectively switch over between the cooling operation and the dehumidifying operation.

Figure 3:
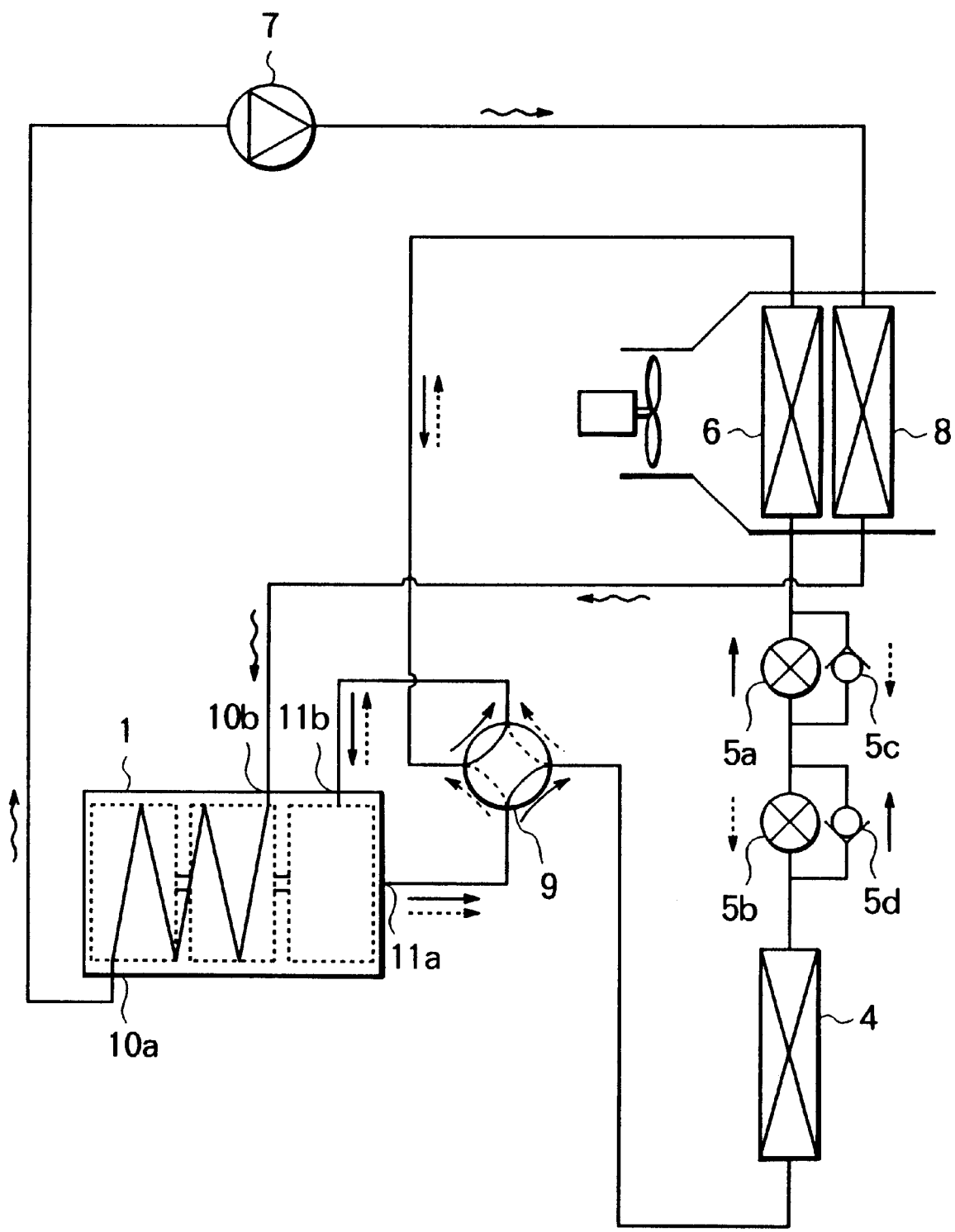
FIG. 3 is a view showing a basic structure of a refrigerant circuit and a hot water circuit in accordance with a second embodiment of the present invention.

A second embodiment of the present invention will now be described. In this second embodiment, the rotational torque of the reversible rotational motor 3 upon the reverse rotation is smaller than the rotational torque of the constant rotational motor 2. Except for the structure of the refrigerant circuit, the other features of the second embodiment of the present invention are the same as those of the first embodiment of the present invention. Accordingly, FIG. 3 shows a basic refrigerant circuit and a hot water circuit in accordance with the second embodiment of the present invention. The difference between the first and second embodiments of the present invention will now be described. Further, in FIG. 3, the wavy arrows indicate the flow direction of the hot water.

Also, the solid arrows denote the flow direction of the refrigerant upon cooling and the broken-line arrows show the flow direction of the refrigerant upon heating.

In the second embodiment of the present invention, an exterior heat exchanger 4, expansion mechanisms 5a and 5b and check valves 5c and 5d and a interior heat exchanger 6 are connected to each other through a four-way switching valve 9 between the refrigerant outlet port 11a and the refrigerant intake port 11b of the heat source unit 1 as the compressor. The flow direction of the refrigerant may be switched by the above-described four-way switching valve 9.

When the compressor mechanism 11 of the heat source unit 1 is driven in a cooling cycle where the four-way switching valve 9 takes a position indicated by the solid lines, the refrigerant flows in the directions indicated by the solid arrows in FIG. 3. Namely, the high pressure refrigerant compressed by the compressor mechanism 11 is discharged from the refrigerant outlet port 11a of the heat source unit 1 to be introduced into the exterior heat exchanger 4 through the four-way switching valve 9 to be condensed and liquefied while being subjected to the heat exchange with the atmosphere. The condensed and liquefied high pressure liquid refrigerant is subjected to the pressure reduction by the expansion mechanism 5a after flowing through the check valve 5d. Thereafter, the refrigerant is introduced into the interior heat exchanger 6 to cool and dehumidify the passenger compartment air, and the refrigerant per se is heated, gasified and returned back to the compressor mechanism 11 within the heat source unit 1 from the refrigerant intake port 11b.

Next, when the compressor mechanism 11 of the heat source unit 1 is driven in a heating cycle (heat pump cycle) where the four-way switching valve 9 takes a connection position indicated by the broken-line lines, the refrigerant flows in the directions indicated by the broken-line arrows in FIG. 3. Namely, the high pressure refrigerant compressed by the compressor mechanism 11 is discharged from the refrigerant outlet port 11a of the heat source unit 1 and introduced into the interior heat exchanger 6 through the four-way switching valve 9 to heat the passenger compartment air and to be condensed and liquefied. The condensed and liquefied high pressure liquid refrigerant is subjected to the pressure reduction by the expansion mechanism 5b after flowing through the check valve 5c. Thereafter, the refrigerant is introduced into the exterior heat exchanger 4 to heat-exchange with the outside air and be heated, and the refrigerant per se is gasified and returned back to the compressor mechanism 11 within the heat source unit 1 from the refrigerant intake port 11b.

Accordingly, when the above-described two motors 2 and 3 are excited in the same rotational direction and drive the heat source unit 1 as a compressor, when the four-way switching valve 9 takes the position of the cooling cycle, it is possible to perform the cooling operation in the same way as the cooling operation of the first embodiment of the present invention.

Also, in the refrigerant circuit of FIG. 3, when the four-way valve 9 takes the heating cycle position, the refrigerant flows in the direction indicated by the broken-line arrows. The passenger compartment air is heated in the interior heat exchanger 6 of the refrigerant circuit that is the heating cycle, and it is possible to perform the heat pump type heating operation for pumping up the heat from the outside air.

Next, when the above-described reversible rotational motor 3 is excited in the reverse rotational direction and the two motors 2 and 3 are excited in the reverse rotational directions to each other to drive the heat source unit 1 as a compressor, in the case where the four-way switching valve 9 takes the position of the cooling cycle, the heating operation to heat the passenger compartment air by the hot water circuit using the heat generated by the two motors 2 and 3 as the heat source and the cooling operation to cool the passenger compartment air by the refrigerant circuit for the cooling cycle are simultaneously performed. Namely, the passenger compartment air is cooled and dehumidified by the interior heat exchanger 6, and thereafter is heated by the hot water in the heater core 8. Accordingly, it is possible to cool and heat the passenger compartment air to thereby perform a so-called dehumidifying operation.

Also, when the four-way switching valve 9 takes the heating position, the heating operation to heat the passenger compartment air by the hot water circuit using the heat generated by both the motors 2 and 3 as a heat source and the heating operation to heat the passenger compartment air by the interior heat exchanger 6 of the above-described refrigerant circuit are simultaneously performed.

As described above, according to the second embodiment of the present invention, the cooling operation by the refrigerant circuit as the cooling cycle; the heat pump type heating operation having a high performance by the refrigerant circuit as the heating cycle; the dehumidifying operation by the passenger compartment air heating operation by the hot water circuit using the heat generated by the motors 2 and 3 due to the exciting electric power as the heat source and by the passenger compartment cooling operation by the refrigerant circuit; and the heating operation having a high performance in which the passenger compartment air heating operation by the hot water circuit using the heat generated by the motors 2 and 3 due to the exciting electric power, and the passenger compartment air heating operation by the refrigerant circuit as the heating cycle are simultaneously performed, may be selectively performed.

Also, as a modification of the above-described second embodiment of the present invention, in the heating operation having a large heating capacity in accordance with the second embodiment, if the excitation of the reversible rotational motor 3 is turned on and off, the heat generated by the motors 2 and 3 is turned on and off, so that the passenger compartment air heating capacity by the hot water circuit and the heating capacity can both be made variable.

Also, when, as shown in the first embodiment of the present invention, the rotational torque upon the reverse rotation of the reversible rotational motor 3 is the same as the rotational torque of the constant rotational motor 2 in the heat source unit 1, and the refrigerant circuit takes the reversible cycle in the same manner as in the above-described second embodiment of the present invention, and further the two motors are excited in the constant rotational direction, and further the refrigerant circuit is operated as the heating cycle, it is possible to perform the heat pump type heating operation in the same way as in the heat pump type heating operation in the above-described second embodiment of the present invention.

A third embodiment of the present invention will now be described with reference to FIGS. 4 to 9. In comparison with the first embodiment of the present invention, in the automotive heating apparatus in accordance with the third embodiment of the present invention, a different heat source unit 1 is used but the same refrigerant circuit and hot water circuit are used. Accordingly, the explanation of the refrigerant circuit and the hot water circuit per se will be omitted to thereby simplify the explanation of the third embodiment of the present invention. Incidentally, in FIGS. 4 to 9 and in the explanation of the third embodiment of the present invention, the same reference numerals as those used in the first embodiment of the present invention are used to indicate the components or members having the same function or structure as those of the first embodiment of the present invention.

Figure 4:
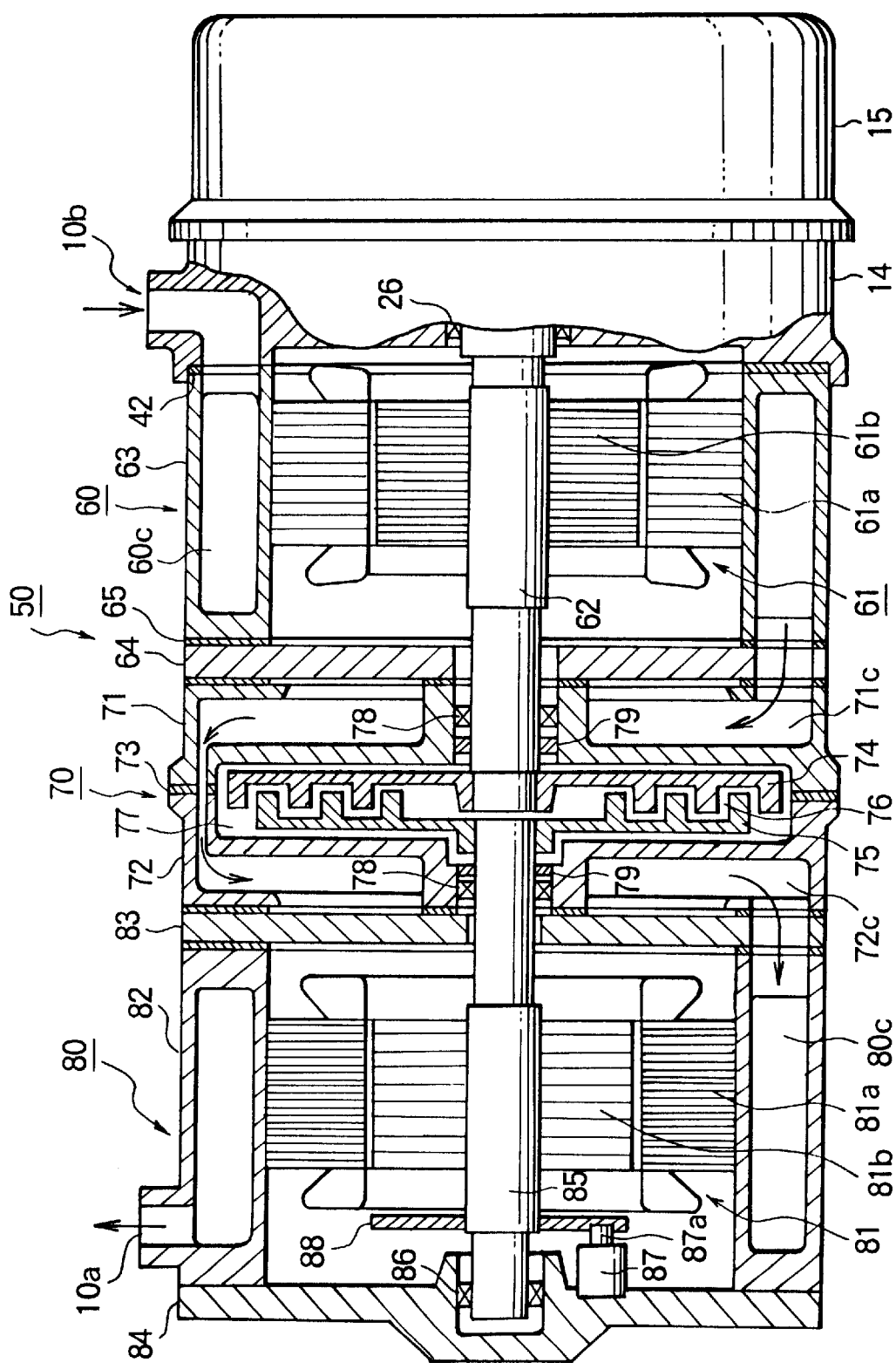
FIG. 4 is a view showing an overall structure of a heat source unit in accordance with a third embodiment of the present invention.
Figure 5:
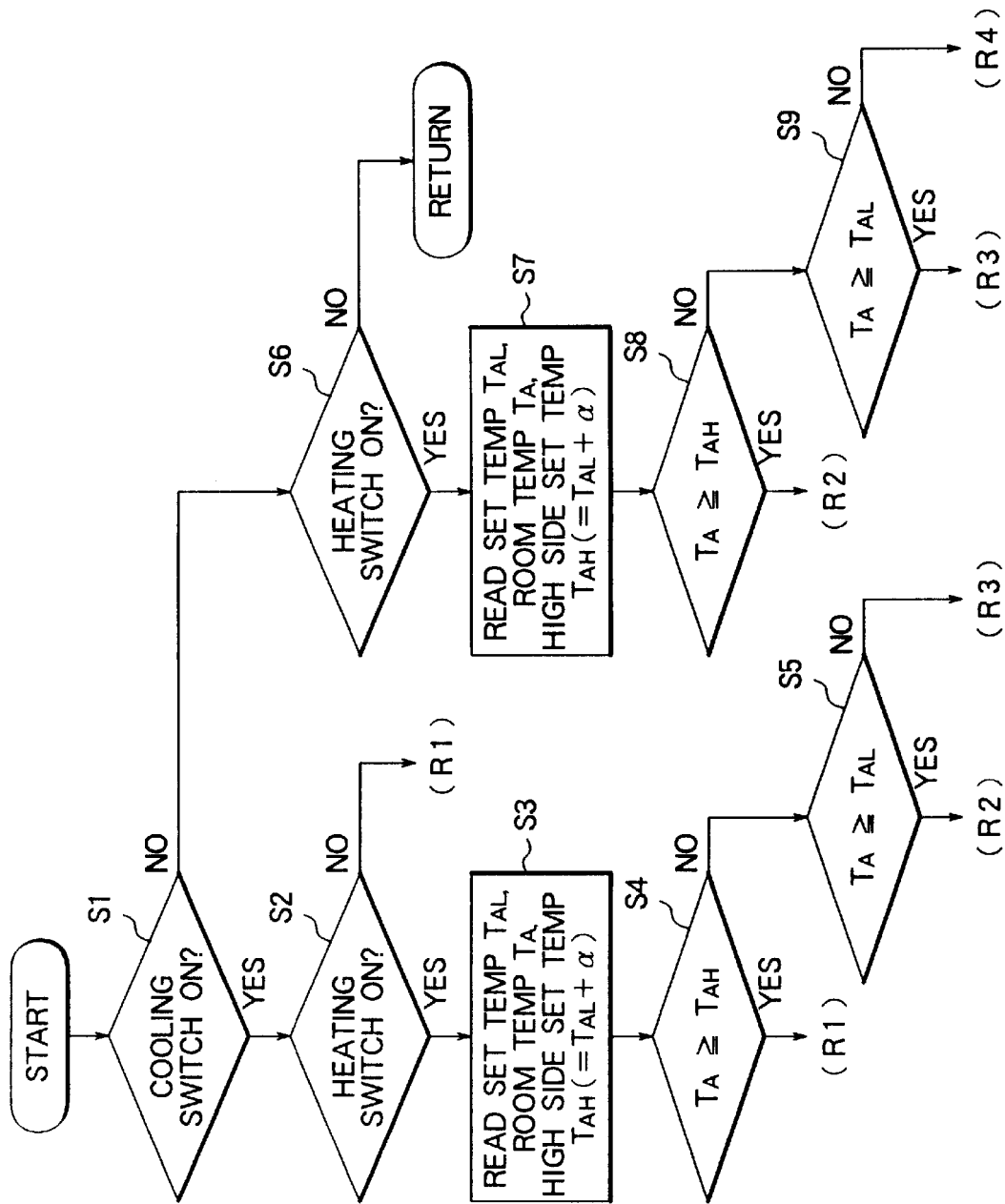
FIG. 5 is a view showing an operational routine in accordance with the third embodiment of the present invention.

FIG. 4 shows the heat source unit 50 of the present embodiment. The heat source unit 50 is composed of a compressor portion for receiving a compressor mechanism 11, a first motor portion 60 for receiving a first motor (electric power motor) 61 for driving the compressor mechanism 11, a second motor portion 80 for receiving a second motor (electric motor) 81 having a lock mechanism, and a heater portion utilizing fluid frictional heat 70 interposed between the two motor portions 60 and 80. Further, in the following description in conjunction with FIG. 4, the right side of FIG. 4 denotes the rear side and the left side thereof denotes the front side of the unit. Also, in FIG. 4, the solid arrows denote the flow direction of the hot water.

Also, in FIG. 4, the compressor portion and the connection housing 14 are the same as those of the above described first embodiment of the present invention. Hence, their detailed explanation will be omitted. However, in the same manner as in the first embodiment of the present invention, the compressor mechanism 11 is received in a space defined by the rear housing 15 and the connection housing 14. The compressor mechanism 11 is driven by a drive shaft 62 of a first motor portion 60, to be described later. Also, a hot water inlet port 10b is formed in the connection housing 14.

The first motor portion 60 is composed of a cylindrical housing 63 and a partitioning wall 64 disposed on the front side of the cylindrical housing 63. A stator 61a of the first motor 61 is fixed to an interior of the cylindrical housing 63. A drive shaft 62 with a rotor 61b fixed thereto is disposed at a center position. The drive shaft 62 is rotatably supported by bearings 26 and 78 disposed at central axial portions of the connection housing 14 and a rear side cup-shaped housing 71 for forming the housing of the heater portion utilizing fluid frictional heat 70 respectively. Then, the cylindrical housing 63 and the connection housing 14, and the cylindrical housing 63 and the partitioning wall 64 are connected to each other through gaskets 42 and 65, respectively.

An annular hot water passage 60c is formed in the circumferential wall of the cylindrical housing 63 for absorbing the generated heat of the first motor 61. The hot water passage 60c is communicated with a hot water inlet port 10b formed in the connection housing 14 at the rear side and is communicated with a hot water passage 71c of the heater portion utilizing fluid frictional heat 70 at the front side.

In the heater portion utilizing fluid frictional heat 70, the front side cup-shaped housing 72 and the rear side cup-shaped housing 71 are coupled with each other at their open end portions through a gasket 73 to thereby form a housing. The inner space of the housing receives a first rotor 74 rotatably fixed to a front end of a drive shaft 62 of a first motor 61 and a second rotor 75 rotatably fixed to a rear end of a drive shaft 85 of a second motor 85. Then, a labyrinth groove portion 76 composed of a plurality of convex and concave circumferential grooves is formed between the two rotors 74 and 75, and at the same time, a viscous fluid such as a silicone fluid is sealed in the space 77 of the housing interior. Then, in the case where the rotor 74 is rotated and the other rotor 75 is fixed, a shearing force is applied to the viscous fluid interposed in the labyrinth groove portion 76 so that heat is generated by fluid frictional heat. Also, with such an arrangement, in the case where the first motor 61 and the second motor 81 are simultaneously excited to drivingly rotate the two rotors 74 and 75, the rotational torque of the second motor is transmitted to the first motor through the above-described viscous fluid.

Bearing portions are formed at central portions of the two cup-shaped housings 71 and 72. First end portions of the drive shafts 62 and 85 of the first motor 61 and the second motor 81, respectively, are rotatably supported by the bearings 78 disposed in the interior of the bearing portions. In order to maintain the sealability of these bearing portions, shaft seals 79 are disposed at an inner side of the respective bearings 78.

L-shaped hot water passages 71c and 72c are formed in the interior of the wall members of the two cup-shaped housings 71 and 72 for absorbing the heat generated in the above-described labyrinth groove portion. The hot water passages 71c and 72c are communicated with each other through the above-described gasket 73 at the joint portion of the two cup-shaped housings 71 and 72. Also, the hot water passage 71c is communicated with the hot water passage 60c of the first motor portion 60 on the rear side as described above, and further, the hot water passage 72c is in communication with the hot water passage 80c of the second motor portion 80, to be described later, on the front side.

The second motor portion 80 is composed of a cylindrical housing 82, a partitioning wall 83 arranged on the rear side of the cylindrical housing 82 and a side wall 84 disposed on the front side of the cylindrical housing 82. Also, a stator 81a of the second motor 81 is fixed to an inner wall surface of the cylindrical housing 82, and further, a drive shaft 85 to which a rotor 81b of the second motor 81 is fixed is disposed at a center position of the housing 82. Then, the drive shaft 85 is rotatably supported by bearings 86 and 78 disposed at central portions of the side wall 84 and the front side cup-shaped housing 72 of the heater portion utilizing fluid frictional heat 70, respectively. An electromagnetic lock mechanism 87 is fixed to the inside of the side wall 84. When the electromagnetic coil disposed in the interior of the electromagnetic lock mechanism 87 is excited, a lock shaft 87a is projected and engaged with a brake plate 88 fixed to the side wall side of the drive shaft 85 to thereby prevent the rotation of the rotor 81b.

Also, an annular hot water passage 80c is formed in the circumferential wall of the cylindrical housing 82 for absorbing the generated heat of the second motor 81. The hot water passage 80c is in communication with a hot water passage 72c of the heater portion utilizing fluid frictional heat 70 on the rear side and is in communication with a hot water outlet port 10a formed in the cylindrical housing 82 on the front side.

The operation of the third embodiment of the present invention will now be described with reference to a flowchart showing an operational routine of the heat source unit 50 as a hot water heater shown in FIGS. 5 to 9.

When this operational routine is entered, first, in step S1 it is determined whether or not the cooling switch is turned on. If the cooling operation is not needed and the cooling switch is turned off, a "NO" determination is made, and the operation goes to step S6 where it is determined whether or not the heating switch is turned on. Conversely, if the temperature of the passenger compartment is high and the cooling operation is needed or the humidity of the passenger compartment is high and the dehumidifying operation is needed so that the cooling switch is turned on, a "YES" determination is made, and the operation goes to step S2 where it is determined whether or not the heating switch is turned on.

In step S2 it is determined whether or not the heating switch is turned on. In the case where the heating switch is turned off, a "NO" determination is made, it is assumed that the cooling operation is needed and the operation goes to the subroutine R1 of the cooling operation, to be described later. Conversely in the case where the heating switch is turned on, a "YES" determination is made, and the operation goes to the input step S3 for reading passenger compartment temperature $T_A$, set temperature $T_{AL}$, and high side set temperature $T_{AH}$. The temperature of the air circulated to the heater core 8 is detected so that passenger compartment temperature $T_A$ is read. The set temperature $T_{AL}$ set by a temperature setting knob is read. Then, the set temperature $T_{AL}$, is registered as a low side set temperature, and at the same time, a high side set temperature $T_{AH}$ obtained by adding a predetermined temperature α(for example, 3° C.) to the low side set temperature $T_{AL}$ is newly set and registered. Then, the operation goes to step S4 to determine whether "$T_A \geq T_{AH}$".

In step S4 it is determined whether or not the passenger compartment temperature $T_A$ is higher than the high side set temperature $T_{AH}$. (for example, 28° C., low side set temperature+α), so if a "YES" determination is made, it is determined that the passenger compartment temperature is much higher than the set temperature, and that the cooling operation is actually needed, even though the heating switch is erroneously turned on, and the operation goes to the subroutine R1 of the cooling operation. Also, conversely, if a "NO" determination is made, the operation goes to step S5 for "$T_A \geq T_{AL}$". In judgement step S5 it is determined whether or not the passenger compartment temperature $T_A$ is higher than the low side set temperature $T_{AL}$ (for example, 25° C., the temperature set by the knob). When the passenger compartment temperature $T_A$ is higher than the low side set temperature $T_{AL}$ and a "YES" determination is made, it is determined that the passenger compartment temperature is somewhat higher than the set temperature, and that the dehumidifying operation with a touch of cooling is needed. The operation goes to the subroutine R2 of the cooling like dehumidifying operation. Also, conversely, when a "NO" determination is made, it is determined that the dehumidifying operation with a touch of heating is needed. The operation goes to the subroutine R3 of the heating like dehumidifying operation, to be described later.

The content of the above-described step S6 is the same as that of the above-described step S2. In the case where the heating switch is turned off and a "NO" determination is made, it is determined that neither cooling nor heating is needed, and the operation is returned. Conversely, in the case where the heating switch is turned on and a "YES" determination is made, the operation goes to an input step S7 of reading the passenger compartment temperature $T_A$, set temperature $T_{AL}$, and high side set temperature $T_{AH}$ and a step S8 "$T_A \geq T_{AH}$" which have the same content as in the above-described steps S3 and S4.

In the case where a "YES" determination is made in the step S8, it is determined that the dehumidifying operation with a touch of cooling is needed, and the operation goes to the subroutine R2 of the cooling like dehumidifying operation, to be described later. Also, in the case where a "NO" determination is made, the operation goes to the step S9 "$T_A \geq T_{AL}$" which has the same content as the step S5.

Then, in the step S9, if it is determined that the passenger compartment temperature $T_A$ is higher than the low side set temperature $T_{AL}$ and the "YES" determination is made, it is determined that the dehumidifying operation with a touch of heating is needed, and the operation goes to the subroutine R3 of the heating like dehumidifying operation. Also, conversely, in the step S9, if it is determined that the passenger compartment temperature $T_A$ is lower than the low side set temperature $T_{AL}$ and the "NO" determination is made, it is determined that the heating operation is needed, and the operation goes to subroutine R4 of the heating operation, to be described later.

Figure 6:
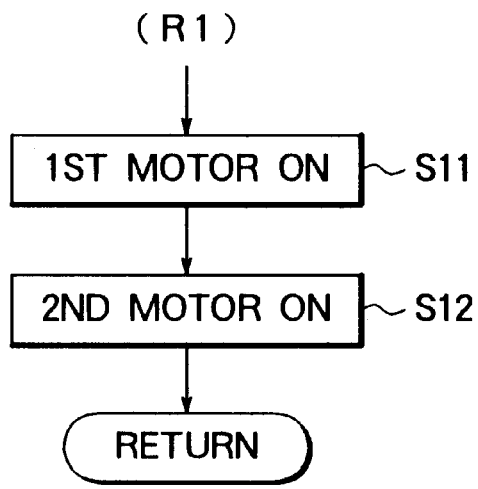
FIG. 6 is a view showing a subroutine for a cooling operation in accordance with the third embodiment of the present invention.

The subroutine R1 of the above-described cooling operation is shown in FIG. 6. In the case where the operation goes to the subroutine R1 in the routine of the flowchart shown in FIG. 5, the operation goes to the output step S11 "TURN FIRST MOTOR ON" and subsequently goes to the output step S12 "TURN SECOND MOTOR ON". In these output steps S11 and S12, signals for turning the first motor 61 and the second motor 81 on are fed to drive the first and second motors 61 and 81, respectively. Accordingly, in the heater portion utilizing fluid frictional heat 70, since the two rotors 74 and 75 are rotated in the same direction, a shearing force is not applied to the viscous fluid in the labyrinth groove portion 76, and conversely the rotational torque of the second motor 81 is transmitted to the first motor 61 by the viscous fluid in this portion. As a result, the compressor mechanism 11 is driven for the cooling operation by the rotational output of the two motors 61 and 81.

Figure 7:
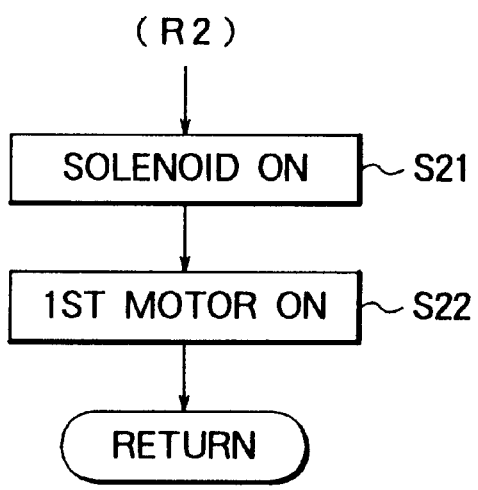
FIG. 7 is a view showing a subroutine for a dehumidifying operation with a touch of cooling in accordance with the third embodiment of the present invention.

The subroutine R2 of the above-described cooling like dehumidifying operation is shown in FIG. 7. The operation goes to an output step S21 "TURN SOLENOID ON" in the case where the operation goes to the subroutine R2 in the routine of the flowchart shown in FIG. 5. In this output step S21, a signal for turning on the electromagnetic coil of the electromagnetic lock mechanism 87 is fed to excite the electromagnetic coil so that the lock shaft 87a is projected to engage with the brake plate 88 to lock the second motor 81. Subsequently, the operation goes to an output step S22 "TURN FIRST MOTOR ON". Then, in the first output step S22, a signal for turning the first motor 61 on is fed to drive the first motor 61.

Since the first motor 61 is thus driven while the second motor 81 is locked, the rotor 75 which is fixed to the drive shaft 85 of the second motor 81 is not rotated, and the rotor 74 fixed to the first motor 61 is rotated. As a result, a shearing force is applied to the viscous fluid in the labyrinth groove portion 76 to generate fluid frictional heat in the viscous fluid. On the other hand, since the second motor 81 is not excited, the heating action is not caused by the second motor 81 per se.

Accordingly, the hot water that flows through the hot water circuit is heated in the hot water passage 60c by the heat generated by the driving of the first motor 61, and is heated in the hot water passages 71c and 72c by the above-described fluid frictional heat. The passenger compartment air is heated in the heater core 8 by the hot water thus heated. At this time, since the compressor mechanism 11 is driven by the first motor 61, the passenger compartment air is cooled in the interior heat exchanger 6.

As a result, a so-called dehumidifying operation is performed in which the passenger compartment air is reheated in the heater core 8 after the passenger compartment air has been subjected to cooling and dehumidifying in the interior heat exchanger 6. Also, the cooling ability of the interior heat exchanger 6 is set to be larger than the heating capacity of the heater core 8 so that this dehumidifying operation becomes a dehumidifying operation with a touch of cooling for the passenger compartment.

Figure 8:
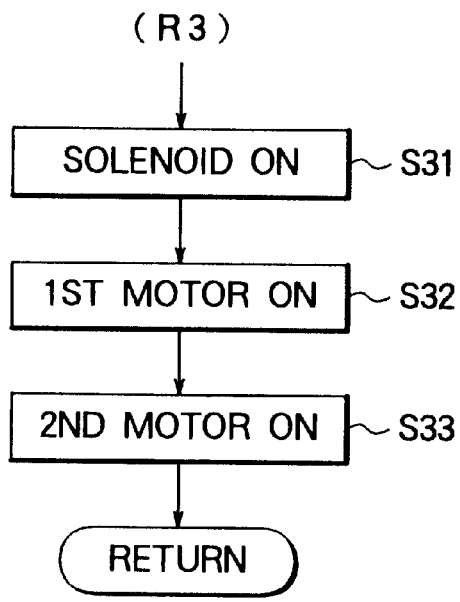
FIG. 8 is a view showing a subroutine for a dehumidifying operation with a touch of heating in accordance with the third embodiment of the present invention.

The subroutine R3 of the above-described heating like dehumidifying operation is shown in FIG. 8. In the case where the operation goes to the subroutine R3 in the routine of the flowchart shown in FIG. 5, the operation goes to the output step S31 "TURN SOLENOID ON". In the same manner as in the above-described output step S21, electric power is supplied to the electromagnetic coil of the electromagnetic lock mechanism 87 to thereby lock the second motor 81. Subsequently, the operation goes to the output step S32 "TURN FIRST MOTOR ON". A signal for turning the first motor 61 on is fed to drive the first motor 61 and to drive the compressor mechanism 11. Subsequently, the operation goes to the output step S33 "TURN SECOND MOTOR ON". In the output step 33, a signal for turning the second motor 81 on is fed to magnetically excite the second motor 81 that has been locked, and heat is generated.

Thus, since the first motor 61 is driven while the second motor 81 is locked, in the same manner as in the subroutine R2, the rotor 75 fixed to the drive shaft 85 of the second motor 81 is not rotated but the rotor 74 fixed to the first motor 61 is rotated. As a result, a shearing force is applied to the viscous fluid in the labyrinth groove portion 76 to generate fluid frictional heat in the viscous fluid.

Accordingly, the hot water that flows through the hot water circuit is heated in the hot water passage 60c by the heat generated by the driving of the first motor 61, and is heated in the hot water passages 71c and 72c by the above-described fluid frictional heat. Furthermore, the hot water is heated by the heat generated due to the exciting electric power in the second motor 81. As a result, the amount of heat for the hot water becomes greater than in the above-described subroutine R2.

As a result, the passenger compartment air is cooled by the low pressure refrigerant in the interior heat exchanger 6 in the same manner as in the above-described subroutine R2, and thereafter, is heated by the hot water in the heater core 8. The dehumidifying operation having a larger heating capacity than the above-described subroutine R2 is performed for the passenger compartment. Also, the heating capacity in the heater core 8 is set to be greater than the cooling capacity of the interior heat exchanger 6 so that this dehumidifying operation becomes a dehumidifying operation with a touch of heating.

Figure 9:
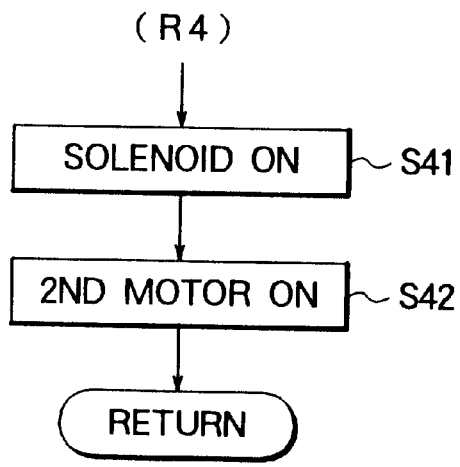
FIG. 9 is a view showing a subroutine for a heating operation in accordance with the third embodiment of the present invention.

The subroutine R4 of the above-described heating operation is shown in FIG. 9. In the case where the operation goes to the subroutine R4 in the routine of the flowchart shown in FIG. 5, the operation goes to the output step S41 "TURN SOLENOID ON". In the same manner as in the above-described output steps S21 and S31, electric power is supplied to the electromagnetic coil of the electromagnetic lock mechanism 87 to thereby lock the second motor 81. Subsequently, the operation goes to the output step S42 "TURN SECOND MOTOR ON". The second motor 81 that has been locked is excited. As a result, the second motor 81 generates the heat by the exciting power.

Thus, in this subroutine, since neither first motor 61 nor second motor 81 is rotated, no shearing force is applied to the viscous fluid of the above-described labyrinth groove portion 76 and no fluid frictional heat is generated by the viscous fluid. Also, since the first motor 61 is not driven, the compressor mechanism 11 is not driven and no cooling operation is effected by the refrigerant.

Accordingly, the hot water that flows through the hot water circuit is not heated in the hot water passage 60c, 71c or 72c. Also, the hot water is heated in the hot water passage 80 by the heat caused by the exciting power in the second motor 81. Also, the passenger compartment air is only heated by the hot water that has been heated in the heater core 8, and is not cooled in the interior heat exchanger 6.

As a result, in the subroutine R4, the heating operation for heating only the passenger compartment air is effected.

As described above, according to the third embodiment of the present invention, in the case where the passenger compartment temperature is high, if the second motor 81 provided with the electromagnetic lock mechanism 87 is not locked and the first and second motors 61 and 81 are electromagnetically excited, the cooling operation through the refrigerant circuit may be performed.

Also, in the case where the passenger compartment air temperature is somewhat high and the humidity is somewhat high, if the second motor 81 is locked and the first motor 61 is electromagnetically excited, by simultaneously performing the heating operation using the heat generated in the heater portion utilizing fluid frictional heat 70 as the heat source and the cooling operation through the refrigerant circuit, the dehumidifying operation with a touch of cooling may be performed.

Also, in the case where the passenger compartment air temperature is somewhat low but the humidity is somewhat high, if the second motor 81 is locked and both the first and second motors 61 and 81 are excited, by simultaneously performing the heating operation using the heat generated in the second motor with the electromagnetic power and the heat generated in the heater portion utilizing fluid frictional heat 70 as the heat source and the cooling operation through the cooling circuit, the dehumidifying operation with a touch of heating may be performed.

Also, in the case where the passenger compartment air temperature is low, if the second motor 81 is locked and the second motor 81 is excited without exciting the first motor 61, the heating operation may be performed by the hot water circuit using the heat generated in the second motor 81 with the exciting power as the heat source.

Thus, in the third embodiment of the present invention, the locking of the second motor and the excitation of the first and second motors are controlled in an on/off manner, respectively, whereby the above-described four h operational modes may be switched.

As a modification of the above-described third embodiment, it is possible to structure the refrigerant circuit as a reversible cycle for reversibly switching the circulation of the refrigerant as in the second embodiment of the present invention.

In this case, when the refrigerant circuit is in the heating cycle, the second motor 81 is locked, and the first motor 61 is excited to drive the compressor mechanism 11, by simultaneously performing the heating operation through the hot water circuit using the heat generated in the heater portion utilizing fluid frictional heat 70 by the fluid frictional heat as the heat source and the heating operation of the heat pump cycle through the refrigerant circuit which is in the heating cycle using the outside air as the heat source, a heating operation having a large heating capacity may be performed.

Also, in this case, when the second motor is excited, it is possible to add the heat generated in the second motor 81 by the exciting power as the heat source for the heating operation through the hot water circuit and to perform a heating operation having a large heat capacity.

Thus, compared to the third embodiment, with the modified third embodiment of the present invention, it is possible to add the heating operations with two different modes and large heat capacities.

According to the invention since the heat generated in the electric motor with the exciting power is used as the heat source of the hot water heater, it is possible to perform the heating operation or warming operation with a non-combustion type heater. Accordingly, it is possible to provide an automotive air-conditioning apparatus which meets the object of a low environmental pollution car without any fear of polluting the atmosphere. Also, since the electric motors generate heat and are utilized as heaters, the temperature of the heating wires may be suppressed to a lower level and the vibration resistance may be improved.

Also, according to the invention in addition to the above-described effect, it is possible to readily restrict the rotation of the electric motor.

Also, according to the invention in addition to the above-described effects, since the electric motor is also used for driving the compressor, the cost may be reduced.

Also, according to the invention by switching the excitation of the electric motors on and off, the cooling operation through the refrigerant circuit, and the dehumidifying operation using the heat generated in the electric motors with the exciting power as the heat source for heating the passenger compartment air may be performed.

Also, according to the invention in addition to the above described effects, by controlling the locking of the second electric motor and the excitation of the first and the second electric motors in the on/off manner, it is possible to switch between a variety of operational modes such as cooling, heating, cooling like dehumidifying, heating like dehumidifying and the like to thereby perform the operation.

Also, according to the invention the refrigerant circuit is switched over in a reversible manner so that a variety of heating operations such as a heat pump type heating operation for pumping in heat from the outside air or a heating operation having a large heating capacity can be performed.

Various details of the present invention may be changed without departing from the spirit and scope thereof. Furthermore, the foregoing description of the embodiments according to the present invention are provided for the purpose of illustration only, and not for the purpose of limiting the present invention as defined by the appended claims and their equivalents.

What is claimed is:

1. An automotive air conditioning apparatus comprising a hot water circuit for heating a passenger compartment, said hot water circuit including a hot water heater, a hot water circulating pump, and a heater core for heating the air of the passenger compartment using hot water conveyed by said hot water circulating pump, wherein said hot water heater comprises, as a heat source, two electric motors coupled to each other, which are electromagnetically excited in reverse rotational directions to each other to restrict the rotations thereof, said electric motors being electromagnetically excitable into a state that the rotation thereof is restricted to thereby generate heat.

2. An automotive air-conditioning apparatus according to claim 1, further comprising a refrigerant circuit for cooling the passenger compartment, said refrigerant circuit including a compressor, an exterior heat exchanger, an expansion mechanism, and an interior heat exchanger, wherein:

said compressor is driven by said electric motors while the rotation of said electric motors are in a non-restricted state.

3. An automotive air-conditioning apparatus according to claim 2, wherein said refrigerant circuit is a reversible cycle type that can be controlled to be selectively switched over.

4. An automotive air-conditioning apparatus according to claim 1, further comprising a refrigerant circuit for cooling the passenger compartment, said refrigerant circuit including a compressor, an exterior heat exchanger, an expansion mechanism and an interior heat exchanger, wherein:

said two electric motors comprise a reversible rotation motor capable of rotating in a reversible rotational direction, and a constant-rotation motor having a rotational torque greater than that of said reversible-rotation motor, said two electric motors being excited in the same rotational direction or mutually reverse rotational directions by selectively switching the electromagnetic exciting direction of said reversible-rotation motor, said compressor being connected to said constant-rotation motor.

5. An automotive air-conditioning apparatus according to claim 4, wherein said refrigerant circuit is a reversible cycle type that can be controlled to be selectively switched over.

6. An automotive air conditioning apparatus comprising:

a hot water circuit for heating a passenger compartment, said hot water circuit including a hot water heater, a hot water circulating pump, and a heater core for heating the air of the passenger compartment using hot water conveyed by said hot water circulating pump, wherein said hot water heater comprises at least two electric motors as a heat source, said two electric motors coupled to each other, which are capable of being electromagnetically excited into the same rotational direction or mutually reverse rotational directions; and a refrigerant circuit for cooling the passenger compartment, said refrigerant circuit including a compressor, an exterior heat exchanger, an expansion mechanism, and an interior heat exchanger, wherein said compressor is driven by said electric motors while the rotation of said electric motors are in a non-restricted state.

7. An automotive air-conditioning apparatus according to claim 6, wherein said refrigerant circuit is a reversible cycle type that can be controlled to be selectively switched over.

* * * * *

UNITED STATES PATENT AND TRADEMARK OFFICE
CERTIFICATE OF CORRECTION

PATENT NO.   : 6,386,279 B1                                               Page 1 of 1
DATED        : May 14, 2002
INVENTOR(S)  : Okabe et al.

It is certified that error appears in the above-identified patent and that said Letters Patent is hereby corrected as shown below:

Column 10,
Line 62, please delete "second motor 85" and insert therefor -- second motor 81 --;

Column 15,
Lines 47-48, please delete "four h operational" and insert therefor -- four operational --.

Signed and Sealed this

Eleventh Day of February, 2003

JAMES E. ROGAN
*Director of the United States Patent and Trademark Office*